United States Patent [19]

Mori

[11] Patent Number: 5,513,308
[45] Date of Patent: Apr. 30, 1996

[54] DEVICE AND METHOD FOR DETERMINING A SERIES OF OPERATIONS FOR INTERACTIVE ASSISTANCE

[75] Inventor: Toshiya Mori, Settsu, Japan

[73] Assignee: Matsushita Electric Industrial Co., Ltd., Osaka, Japan

[21] Appl. No.: 114,753

[22] Filed: Sep. 1, 1993

[30] Foreign Application Priority Data

Sep. 3, 1992 [JP] Japan .................... 4-236012

[51] Int. Cl.⁶ .................................................. G06F 15/00
[52] U.S. Cl. ................................................................ 395/155
[58] Field of Search ............................ 395/152, 155–161; 434/118; 345/117–120

[56] References Cited

U.S. PATENT DOCUMENTS

| | | | |
|---|---|---|---|
| 4,545,015 | 12/1982 | Baunach et al. | 364/419.1 |
| 4,648,062 | 3/1987 | Johnson et al. | 395/155 |
| 4,964,077 | 10/1990 | Eisen et al. | 395/155 |
| 5,042,006 | 2/1989 | Flohrer | 395/111 |
| 5,119,479 | 9/1989 | Arai et al. | 395/156 |
| 5,122,972 | 6/1992 | Richards et al. | 395/157 |
| 5,157,768 | 10/1992 | Hoeber et al. | 395/157 |
| 5,175,812 | 12/1992 | Krieger | 395/156 |
| 5,200,893 | 2/1990 | Ozawa et al. | 364/419.1 |
| 5,214,761 | 11/1991 | Barrett et al. | 395/884 |
| 5,235,679 | 8/1993 | Yoshizawa et al. | 395/156 |
| 5,377,319 | 12/1994 | Kitahara et al. | 395/161 |
| 5,388,993 | 2/1995 | McKiel et al. | 434/118 |
| 5,434,963 | 7/1995 | Kuwamoto | 395/155 |

FOREIGN PATENT DOCUMENTS

| | | |
|---|---|---|
| 63-257016 | 4/1987 | Japan . |
| 63233423 | 3/1990 | Japan . |

OTHER PUBLICATIONS

The Worksheet Utilities, Funk Software, 1987, pp. 10–20, 48–60.
Microsoft Windows, 1992, screen pp. 1–3.

*Primary Examiner*—Mark R. Powell
*Assistant Examiner*—John E. Breene
*Attorney, Agent, or Firm*—Price, Gess & Ubell

[57] ABSTRACT

An operator guide device is constructed to detect guidance needed by the user with an inputted key word request. The key word is extracted from the request, referenced by a corresponding table, and used to target an operation. A list of operations is determined from the current operating state and the target operation. Guide or help information corresponding to each of the operations in the list is displayed to guide the user to the target operation through several state transitions. Furthermore, the help information displayed on the screen is reflective of the user's competence or proficiency level for each operation.

8 Claims, 17 Drawing Sheets

Fig.5

| operation item | operation guide program |
|---|---|
| A | demoa() |
| B | demob() |
| C | democ() |
| D | demod() |
| E | demoe() |
| F | demof() |
| G | demog() |
| H | demoh() |
| I | demoi() |
| J | demoj() |
| K | demok() |
| L | demol() |
| M | demom() |
| N | demon() |

| operation item | key word |
|---|---|
| A | Ka |
| B | Kb |
| D | Kc,Kd |
| E | Ke,Kf,Kk |
| G | Kd,Kg |
| H | Kh |
| I | Ke,Kg,Kk |
| K | Kd,Ki |
| L | Kj |
| M | Ke,Ki.Kk |
| N | Kl |

Fig.8

| operation item | operation state program |
|---|---|
| A | proga() |
| B | progb() |
| C | progc() |
| D | progd() |
| E | proge() |
| F | progf() |
| G | progg() |
| H | progh() |
| I | progi() |
| J | progj() |
| K | progk() |
| L | progl() |
| M | progm() |
| N | progn() |

| Japanese language word processor |
|---|
| Gentleman:<br>　　　The season of fresh verdure has arrived. We anticipate you are in the best of health.<br>　　　We are pleased to announce you that our usual school picnic will be scheduled this year as follows. . . |

Fig. 10 (b)

| Japanese language word processor |
|---|
| Gentleman:<br>　　　The season of fresh verdure has arrived. We anticipate you are in the best of health.<br>　　　We are pleased to announce you that our usual school picnic will be scheduled this year as follows. . .<br><br>　　　　　　　　　　　operation guide request > |

| Japanese language word processor |
|---|
| Gentleman:<br>　　　The season of fresh verdure has arrived. We anticipate you are in the best of health.<br>　　　We are pleased to announce you that our usual school picnic will be scheduled this year as follows. . .<br><br>　　　　　operation guide request > delete whole document |

| operation item | frequency | competence |
|---|---|---|
| P | N | known |
| Q | N-1 | unknown |
| R | N | known |
| S | N | known |
| T | N-1 | unknown |
| U | N | known |
| V | N+1 | known |
| W | N-1 | unknown |

Fig.13

| operation item | operation guide program | |
| | known | unknown |
|---|---|---|
| P | demop1() | demop2() |
| Q | demoq1() | demoq2() |
| R | demor1() | demor2() |
| S | demos1() | demos2() |
| T | demot1() | demot2() |
| U | demou1() | demou2() |
| V | demov1() | demov2() |
| W | demow1() | demow2() |

DEVICE AND METHOD FOR DETERMINING A SERIES OF OPERATIONS FOR INTERACTIVE ASSISTANCE

BACKGROUND OF THE INVENTION (1) Field of the invention

The present invention relates to an information processing device, particularly to an operation guide device which displays documentation to guide its user on how to execute desired operation.

(2) Description of the Related Art

Generally, an operation guide device is accommodated inside of an information processing device, such as a word processor, so that a user can summon documentation which instructs him/her how to operate the information processing device. The documentation includes operation method and operation procedure, and it is displayed on the CRT (Cathode Ray Tube).

An example of the operation guide device, Japanese Patent Publication No. 63-250716, will be described hereunder with reference to FIG. 1. As shown in the figure, the operation guide device comprises a microcomputer 301, a display unit 302 including CRT or the like, an input unit 303 including a keyboard or the like, a memory unit 304, an application memory unit 305, a help memory unit 306, and a command memory unit 307.

Operation of the operation guide device with above construction will be described briefly. A user inputs a command through the input unit 303; and the operation guide device responds to this command by employing the microcomputer 301, the application memory unit 305, and the command memory unit 307. When a user encounters a problem or forgets a command while running a program, however, the user summons a documentation by pressing a designated HELP key or entering a HELP command through the input unit 303. Responding to this command, the microcomputer 301 generates a help documentation display based on an operation guide program stored in the help memory unit 306, and displays it. The help documentation display in this case provides a descriptive instruction how to forward the running program. Further, an operation sample display will be displayed on the display unit 302 simultaneously if the help documentation display does not provide sufficient guidance. The operation sample display is a sample display of required operation. Thus, the operation guide device provides a user of the information processing device with sufficient operation guidance when the user encounters an incomprehensible or an unfamiliar operation.

The help documentation display and the operation sample display at the display unit of the above conventional operation guide device do not satisfy a user's needs when a user hardly knows about required operation or operation procedures so that he/she cannot figure out what documentation is to be selected. Also in some cases required operations are so complex that they prevent a user from gaining a view of overall operation. In those cases, even the help documentation display and the operation sample display do not help the user to gain the overall view and locate required operations in the whole operation, although they instruct the user how to complete required operations. Consequently, the user's operation goal to implement the whole operation will be hardly possible.

Further, neither the help documentation display nor the operation sample display reflects a user's competence for the information processing device; therefore, they will not contribute to an experienced user with some training as much as they do to an inexperienced user.

The number of functions realized by an information processing device has been increasing. For example, a word processor possesses not only document generation function but also learning function, batch conversion function, diagram generation function, and editorial function. Along with the increase of functions, construction and operation of an information processing device becomes complex, and the number of users fully experienced with such devices becomes fewer and fewer. Consequently, an operation guide device for satisfying needs of inexperienced users has been strongly desired.

SUMMARY OF THE INVENTION

Accordingly, it is a first object of the present invention to provide an operation guide device capable of displaying operation procedures of an information processing device in accordance with a user's needs.

The first object may be fulfilled by an operation guide device for displaying an operation guide in accordance with a request made by its operator, the operation guide indicating how to execute a required operation which needs to be operated in order to complete a target operation, the operation guide device comprising a first input unit for inputting an operation guide request message to request the operation guide, a second input unit for inputting a message naming the target operation, an operation state detection unit for detecting the current operation state of an information processing device being operated by the operator of the operation guide device, an operation determination unit for determining a series of operations embodying the required operation, an operation guide display storage unit for holding help documentation for each operation to be executed at the information processing device, a display unit, and a control unit for reading from the operation guide display storage unit the help documentation responding to each of the operations determined at the operation determination unit and displaying the help documentation at the display unit.

The current operation state detected at the operation state detection unit may be a small unit of a program to be operated by the information processing device in accordance with input through a keyboard or the like.

The operation determination unit may comprise a key word extract unit for extracting a key word from the message inputted by the second input unit, a target operation detection unit for detecting a target operation corresponding to the key word extracted at the key word extract unit in accordance with a correspondence table showing correspondence between each target operation and each key word, an operation state transition memory unit for holding each change in the operation state of the information processing device, and an operation determination unit for referring to the operation state transition memory unit to determine the operations embodying the required operation based on the current operation state detected at the operation state detection unit and the target operation detected at the target operation detection unit.

It is a second object of the present invention to provide an operation guide device capable of instructing a user how to use an information processing device in accordance with his/her proficiency for the information processing device.

The second object may be fulfilled by the operation guide device further comprising a proficiency level storage unit for holding a proficiency level of the operator for each operation at the information processing device, wherein the operation guide display storage unit may hold the help documentation for each of two proficiency levels of the operator, the proficiency levels including a known level and an unknown level; and control to read from the operation guide display storage unit the help documentation for each of the operations determined at the operation determination unit in responding to the proficiency level of the operator stored in the proficiency level storage unit.

The proficiency level storage unit may hold a space to be filled with frequency information indicating how many times the operator has executed each operation at the information processing device before.

The operation determination unit may be comprised of a judgement unit for judging if there are two or more than two sorts of the required operations, the required operation starting with the current operation and ending with the target operation; detect from the proficiency level storage unit the frequency information for each required operation when the judgement unit judges that two or more than two sorts of the required operations exist; and select the required operation corresponding to the frequency information having the largest value to be the operation guide.

The operation guide device may further comprise a count unit for counting a frequency, the frequency indicating how many times the operator has executed each operation at the information processing device before, a comparison unit for comparing the frequency at the count unit to a threshold value defining the proficiency level of the operator; and a writing unit for writing into the proficiency level storage unit the frequency and comparison result at the comparison unit.

The first input unit may comprise special key on a keyboard, and the second input unit may comprise alphanumeric keys and punctuation key on the keyboard.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 shows content of an operation procedure memory unit;

FIG. 7 is a table showing correspondence between an operation item and a key word;

FIG. 8 is a table showing correspondence between an operation item and an operation state program detected at an operation state detection unit;

FIG. 12 shows content of a user's competence memory unit;

FIG. 13 shows content of an operation procedure memory unit in the second embodiment of the present invention;

DESCRIPTION OF THE PREFERRED EMBODIMENTS

Embodiment 1

Figure 1:
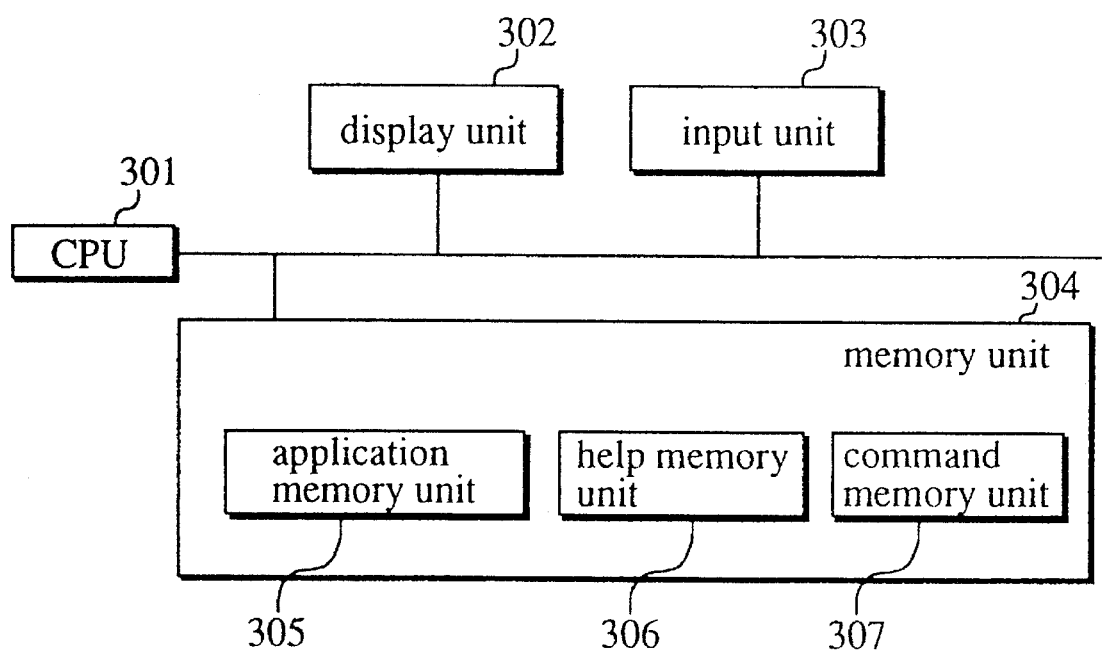
FIG 1 is a block diagram depicting construction of a conventional operation guide device.
Figure 2:
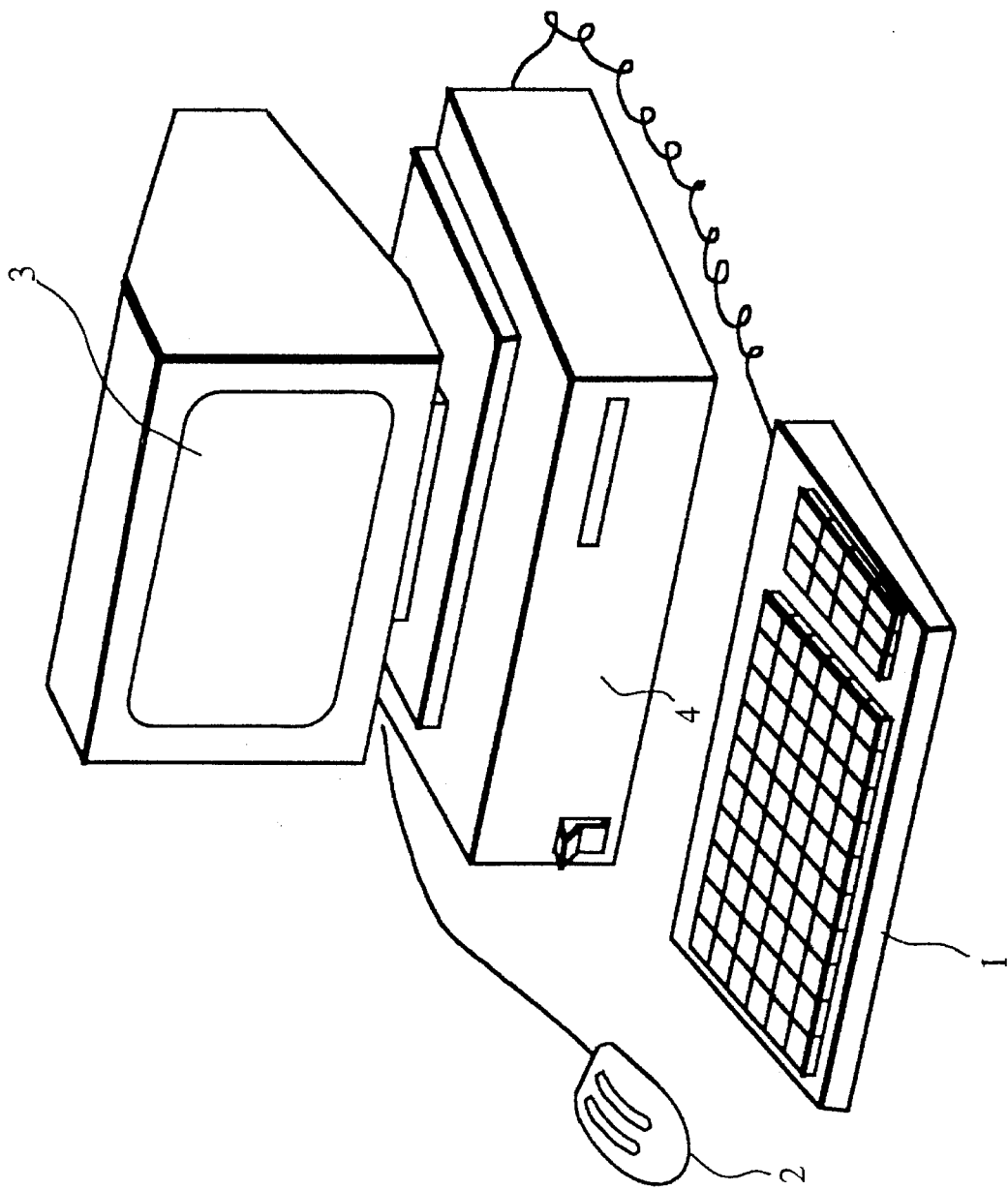
FIG. 2 is an illustration showing computer system including an operation guide device of the present invention.
Figure 3:
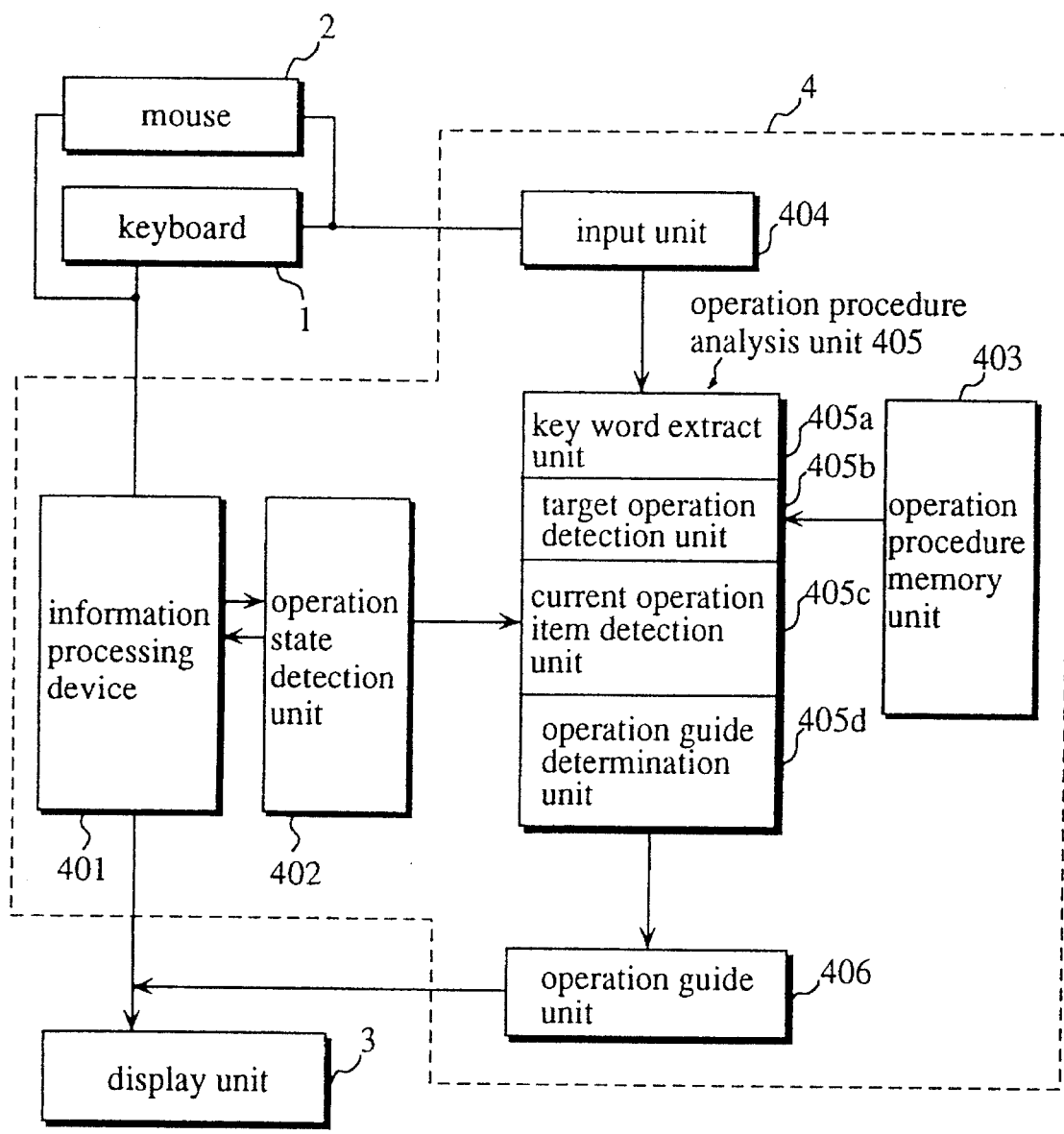
FIG. 3 is block diagram depicting operation of the operation guide device in a first embodiment of the present invention.

Computer system including an operation guide device is shown in FIG. 2. As shown in the figure, the computer system also includes a key board 1, a mouse 2, a CRT (Cathode Ray Tube) display unit 3, and a control unit 4. FIG. 3 shows operation of the operation guide device, in which like components are labeled with like reference numerals with respect to FIG. 2. In the figure, an information processing device 401 is a computer program which inputs data through a word processor and the mouse 2, and displays the input data on the display unit 3 as well as processes the input data. An accounting software is an example of such a computer program. To be noted, the information processing device 401 herein implements inter-process communication with an operation state detection unit 402 so that operation state of the information processing device 401 can be detected by the operation state detection unit 402 at each moment. Also as an example of the information processing device 401, a software "BE word processor" to be operated by UNIX is employed herein; and the above operation state refers to the start of an operation guide program which corresponds to each operation item such as "insert a floppy disk", "character input via keyboard", "delete characters", "move", or "copy".

Figure 4:
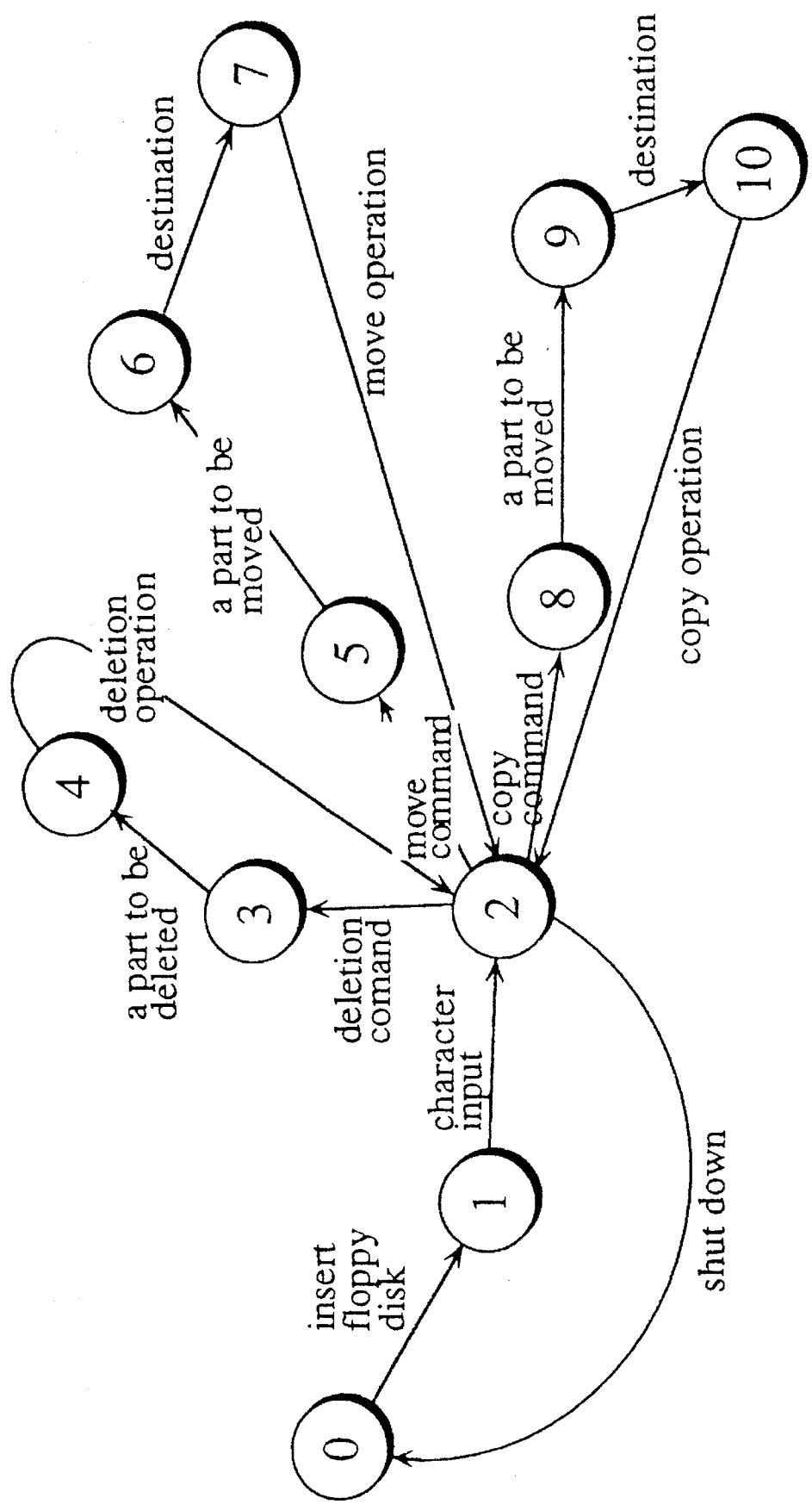
FIG. 4 shows operation state of the information processing device.

The information processing device 401 changes its operation state in responding to an operation item, and this will be described with reference to FIG. 4. For example, operation state of the information processing device 401 will become "1" when power source thereof is turned on and a floppy disk is inserted thereinto. Then, the operation state will be changed from "1" into "2" at input of characters. Next, the operation state will be changed from "2" into "3", "5", "8" at input of a character deletion command, input of a sentence move command, and input of a sentence copy command respectively. Further, the operation state will be forwarded from "3" into "4" at designation of a part to be deleted; from "5" into "6" at designation of a part to be moved; from "8" into "9" at designation of a part to be pasted somewhere else. The operation states "6" and "9" will be changed into "7" and "10" respectively at destination designation. Then, the states "4", "7", "10" will be returned to be "2" at completion of sentence deletion operation, sentence move operation, and sentence copy operation. The state will be changed from "2" into "0" at shut down operation.

The above operation states of the information processing device 401 are detected by the operation state detection unit 402 by way of a communication therewith.

An operation procedure memory unit 403 in FIG. 5 holds correspondences between an operation item and an operation guide program. Each of the operation items A–E in the figure corresponds to the operation item in FIG. 4. To be concrete, they are listed in the following table.

| | |
|---|---|
| A | insert floppy disk |
| B | character input |
| C | deletion command |
| D | a part to be deleted |
| E | deletion operation |
| F | move command |
| G | a part to be moved |
| H | destination |
| I | move operation |
| J | copy command |
| K | a part to be copied |
| L | destination |
| M | copy operation |
| N | shut down |

Figure 6:
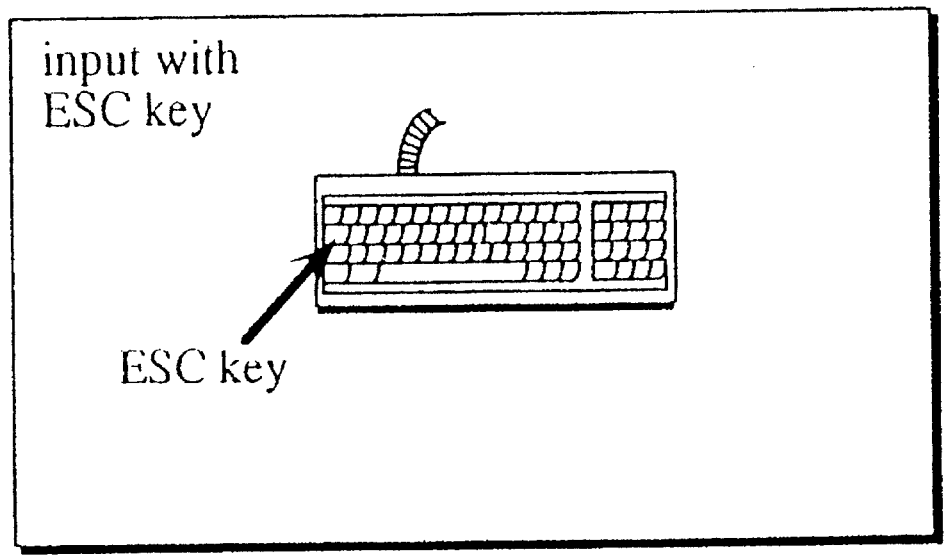
FIG. 6(a) and FIG. 6(b) shows operation samples each of which corresponds to an operation item.
Figure 6:
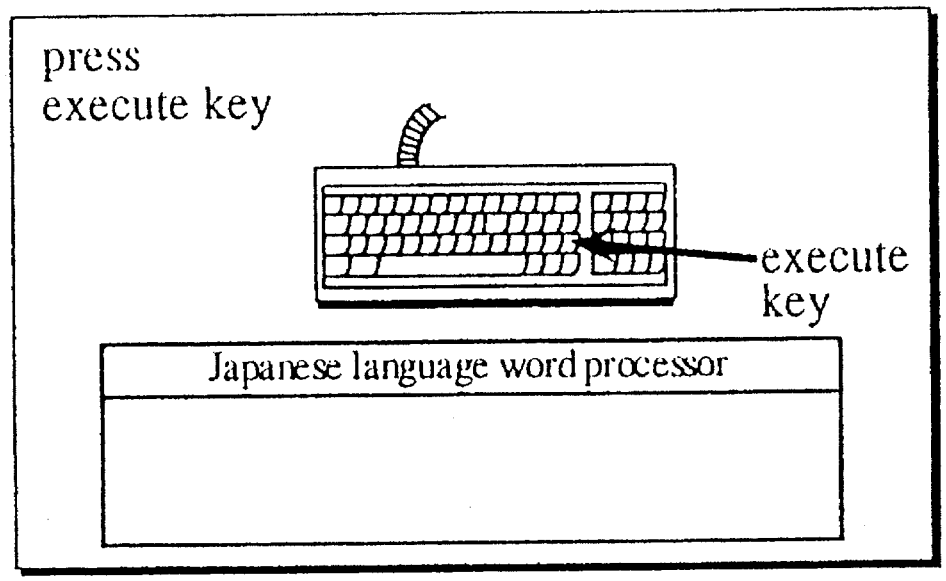

An operation guide program stored in the operation procedure memory unit 403 does not carry program listing but holds a help documentation to be displayed. For example, an operation guide program corresponding to operation item A is called demo a( ), and the operation guide program demo a( ) displays a help documentation on the display unit 3, saying "set a disk to the disk drive". As other examples, demo c( ) and demo e( ) corresponding to operation items C and E respectively display operation sample screens on the display unit 3. Each of the operation sample screens instructs a user to press a predetermined function key as shown in FIG. 6(a), FIG. 6(b) respectively.

An input unit 404 informs an operation guide unit 406 that the HELP key on the keyboard 1 was pressed by a user; then receives character input via the keyboard 1 until display of a help documentation is completed.

An operation procedure analysis unit 405 mainly comprises a key word extract unit 405a for extracting a key word from an operation guide request message inputted by a user; a target operation detection unit 405b for detecting a target operation item according to the key word; a current operation item detection unit 405c for detecting a current operation item with reference to an operation state of the information processing device 401; and an operation guide determination unit 405d for determining a required operation item in accordance with the target operation item detected at the target operation detection unit 405b and the current operation item detected at the current operation item detection unit 405c, then sending an operation guide program corresponding to the required operation item to an operation guide unit 406.

The above key word extract unit 405a holds key words Ka–Kk in a following table; and examines if the operation guide request message input by a user has one of the key words; and extracts the key word exiting therein. For example, key word Kf will be extracted from the operation guide message which says "Instruct how to delete sentences".

| | |
|---|---|
| Ka | insert floppy disk |
| Kb | character input |
| Kc | deletion command |
| Kd | a part to be deleted |
| Ke | sentences |
| Kf | deletion operation |
| Kg | move command |
| Kh | destination |
| Ki | copy command |
| Kj | destination |
| Kk | copy operation |
| Kl | shut down |

As shown in FIG. 7, the target operation detection unit 405b holds correspondence between an operation item and a key word, and detects a target operation item corresponding to a key word extracted at the key word extract unit 405a. As for the above operation guide request message, operation item E corresponding to the key word Kf will be detected as a target operation item.

As shown in FIG. 8, the current operation item detection unit 405c holds correspondence between an operation item and an operation state program; and detects a current operation item which corresponds to a program currently operated at the information processing device 401. The current program corresponds to current operation state of the information processing unit which was detected by the operation state detection unit 402. Each program herein includes a small unit of operation. For example, prog a( ) reads data stored at a predetermined area of a floppy disk at insert thereof; prog b( ) inputs characters; and prog c( ) deletes sentences when DELETE key is pressed.

The operation guide determination unit 405d detects a required operation in accordance with the current operation item detected at the current operation item detection unit 405c and the target operation detected at the target operation detection unit 405b; and detects an operation guide program corresponding to the required operation item from the operation procedure memory unit 403. In the above example, operation item E was detected at the target operation detection unit 405b. Further, it is assumed that operation item A is detected at the current operation item detection unit 405c. In this case, the operation guide determination unit 405d will detect operation items B, C, D, E are required operations. That is, the user needs to be instructed with help documentation for operation items B, C, D, E in this order; and once instructed with them, the user will be able to complete the target operation item E. Subsequently, the operation guide determination unit 405d reads out operation guide programs demo b( ), demo c( ), demo d( ), and demo e( ) corresponding to the required operation items B, C, D, E respectively.

Figure 10:
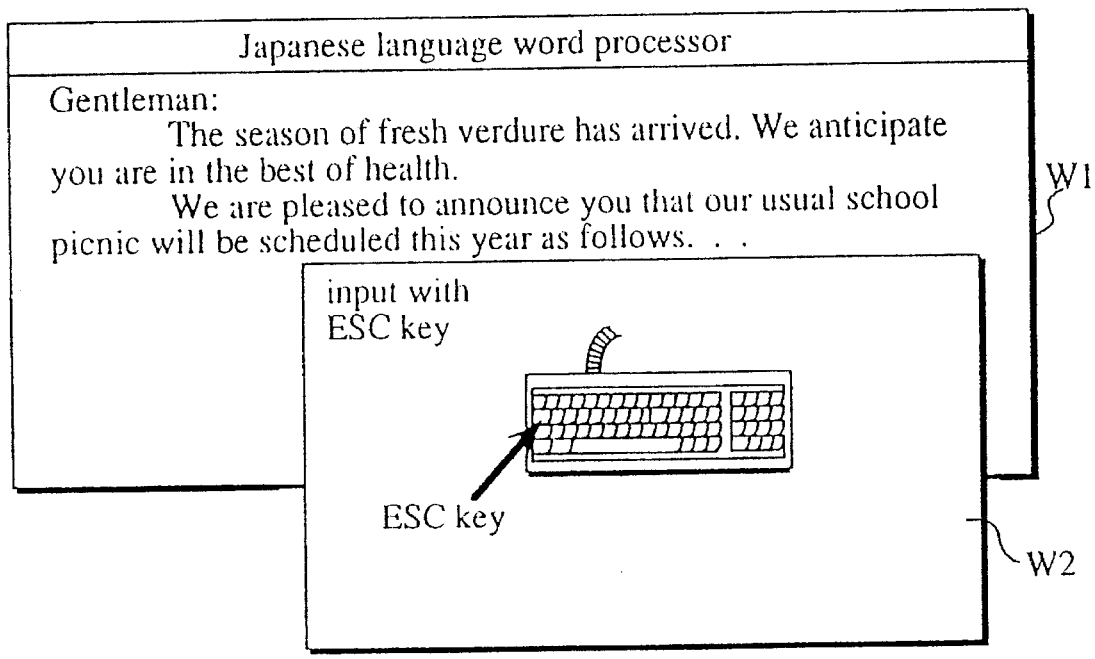
FIG. 10 (a), FIG. 10 (b), FIG. 10 (c), FIG. 10 (d), FIG. 10 (e), and FIG. 10 (f) show a change in a help documentation display on a display unit.
Figure 10:
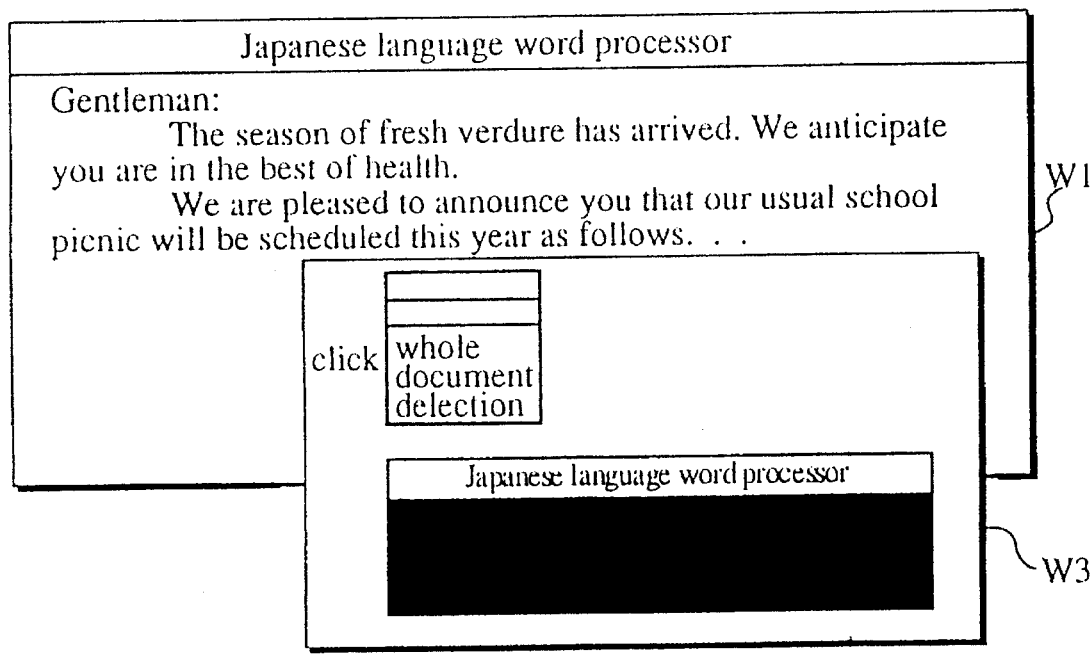
Figure 10:
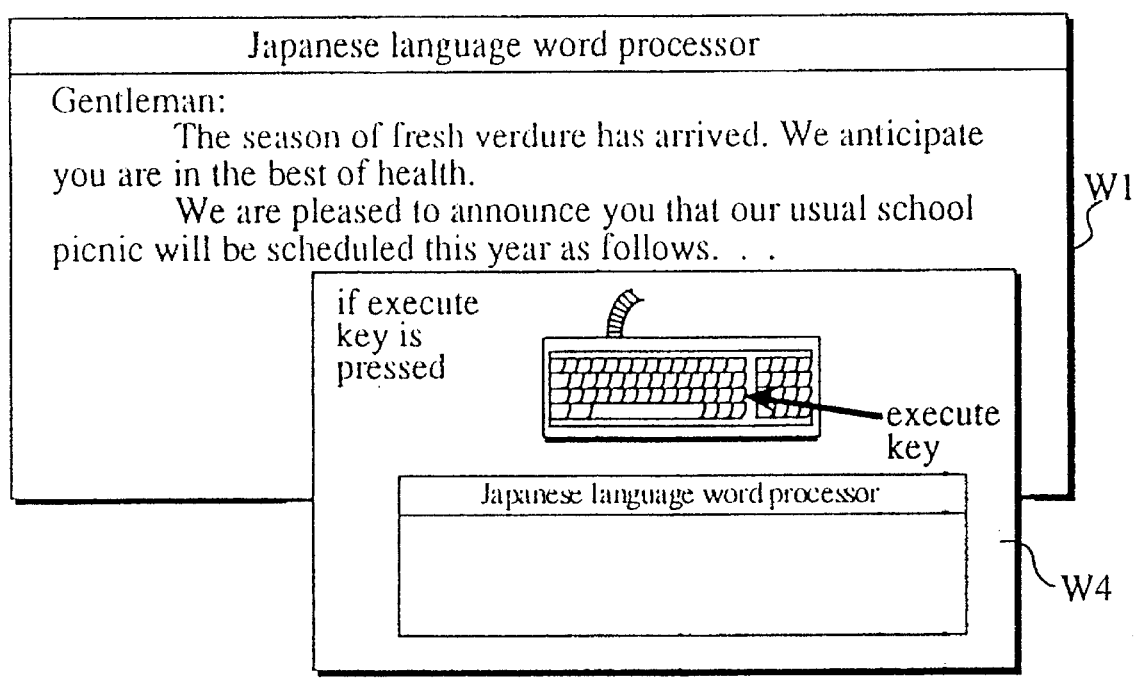

Informed by the input unit 404 that the user pressed HELP key, the operation guide unit 406 generates a window on the display unit 3, which is shown as P1 in FIG. 10 (b) and FIG. 10 (c); and operates operation guide programs on the display unit 3 provided by the operation guide determination unit 405d.

Figure 9:
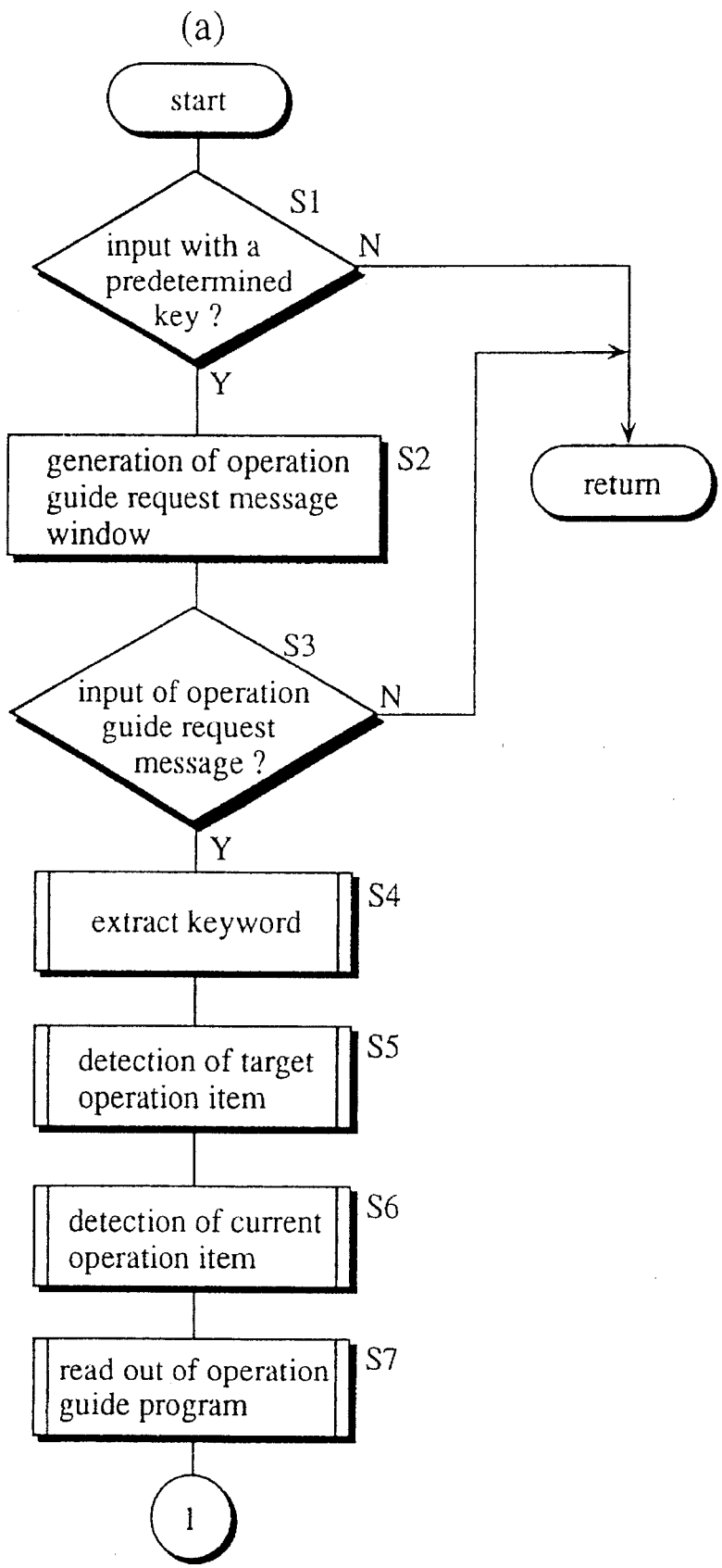
FIG. 9(a), FIG. 9(b) are flow charts describing operation of the operation guide device in the first embodiment of the present invention.
Figure 9:
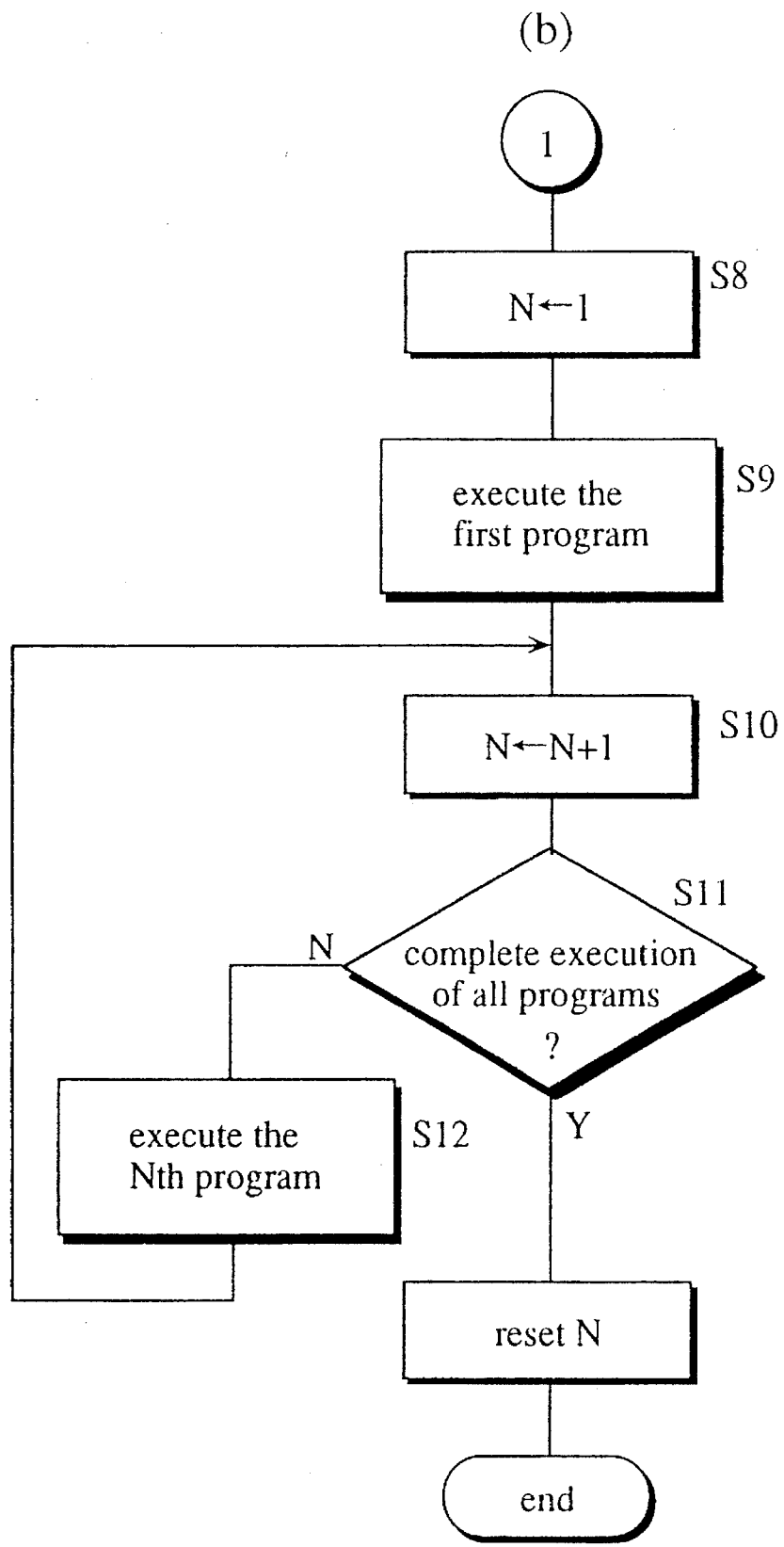

Operation of the information processing device with the above construction will be described as referring to FIG. 9 (a) and FIG. 9(b). It is assumed that the information processing device 401 is running a document generation program; and a document in FIG. 10 (a) is displayed on the display unit 3. In this case, the current operation state of the information processing device 401 is "2" in FIG. 4. The user wants to know how to delete the document in the figure, so that he/she presses HELP key on the keyboard 1 (S1). Detecting that the HELP key was pressed by the user, the input unit 404 has the operation guide 406 unit generate a window on the display unit 3, such as P1 in FIG. 10 (b); and instructs the user to fill the window with an operation guide request message (S2). To be noted, once the HELP key is pressed by the user, further input to the information processing device 401 will be forbidden until operation guide programs are all operated.

The user inputs an operation guide request message which requests instruction for a required operation (S3). As shown in FIG. 10 (c), the window P1 is filled with the operation guide request message; and the key word extract unit 405a extracts a key word from the operation guide request message (S4). In the above example, key word Kf will be detected from the operation guide request message requesting the deletion of the input document. Then, the target operation detection unit 405b detects the target operation item E which corresponds to the key word Kf in FIG. 7 (S5). If no target operation corresponding to the key word is found, the user will be asked to input another operation request message. Also if two or more than two target operations correspond to the key word, there will be three methods available to select one thereof. First, all the target operations corresponding to the key word are displayed in the menu and the user selects one of the target operations. Second, the user inputs another operation guide request and the key word is extracted therefrom. Then, the target operation is determined with reference to the key word extracted previously and the key word extracted this time. Even when the target operation is not determined for the first, the above operation is repeated until the target operation is determined. Third, the second method is repeated until the number of the determined target operations reaches the predetermined value. The predetermined number indicates the target operations which can be displayed in the menu. The determined target operations are displayed; and the user selects one thereof.

The current operation item detection unit 405c learns from the operation state detection unit 402 the operation state that the information processing device 401 had indicated before the user pressed HELP key; then finds in FIG. 8 the current operation item corresponding to such operation state (S6). In the above example, the operation state of the information processing device 401 was "2" immediately before the user had pressed the HELP key; and the operation state detection unit 402 detects prog b( ) corresponding to it. Consequently, the current operation item B which corresponds to prog b( ) will be detected.

Informed of the current operation item B and the target operation item E, the operation guide determination unit 405d determines that the user needs help documentation for operation items C, D, and E; reads from the operation procedure memory unit 403 operation guide programs demo c( ), demo d( ), demo e( ) corresponding thereto respectively; and sends these operation guide programs to the operation guide unit 406 (S7). Receiving theses programs, the operation guide unit 406 sets 1 to variable (S8); and operates demo c( ) which should be operated first of all the operation guide programs provided by the operation guide determination unit 405d (S9). To illustrate this in FIG. 10 (d), the program demo c( ) generates a help documentation screen W2 on the display unit 3 being overlapped with the a document screen W1; and fills the help documentation screen W2 with help documentation which shows a function key to be pressed. When operation of the program demo c( ) is completed, the variable is forwarded to be 2 (S10), and the program demo d( ) locating in the second place will be operated (S11). At operation of the program demo d( ), a help documentation message indicating how to designate a part to be deleted is displayed at a help documentation screen W3. This help designation message at the help documentation screen W3 is shown in FIG. 10 (e). Next, as shown in FIG. 10(f), the program demo f( ) will be operated. At operation of the program demo f( ), a help documentation instructing how to execute deletion operation is displayed at a help documentation screen W4. Thus, all the operation guide programs which were sent to the operation guide unit 406 are operated (S11). At completion of all the operation guide programs, no help documentation remains at the display unit 3, but only the original document in FIG. 10 (a) remains thereat. Input to the document processing device 401 via the keyboard 1 is permitted now; and generation of the document restarts. Having been instructed by the help documentation, the user understands what needs to be done to complete the target operation. Now, the user actually conducts the instructed operations; as a result, the target operation will be applied to the original document.

Embodiment 2

Figure 11:
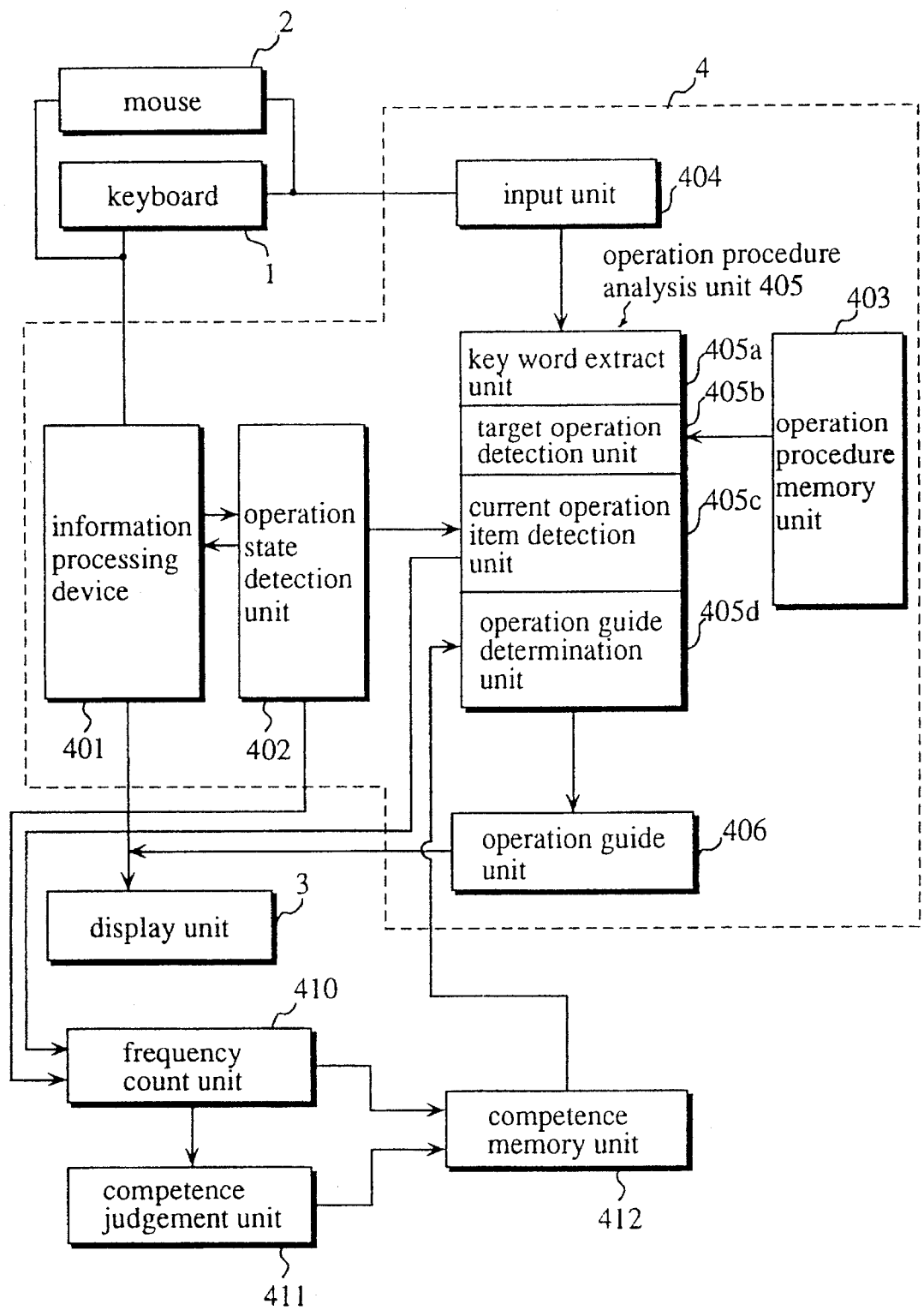
FIG. 11 is a block diagram depicting operation of an operation guide device in a second embodiment of the present invention.

In a second embodiment of the present invention, a user's competence for an information processing device will be reflected on help documentation to be provided to the user. The information processing device in the second embodiment is described hereinafter with reference to FIG. 11, in which like components are labeled with like reference numerals with respect to the first embodiment, and the description of these components is not repeated. As shown in the figure the information processing device includes a frequency count unit 410, a competence judgement unit 411, and a competence memory unit 412 besides the components of the information processing device in the first embodiment. Further, operations of the operation guide determination unit 405d and the operation procedure memory unit 403 do not agree with those in the first embodiment, and discrepancy will be described later.

As shown in FIG. 12, the competence memory unit 412 holds information corresponding to each operation item, the information including frequency and competence. The frequency indicates how often the information processing device 401 has operated an operation item so far, and the competence is either "known" or "unknown" determined by comparing the frequency to a predetermined frequency N being a threshold value.

The frequency count unit 410 is informed by the current operation item detection unit 405c of the current operation item as well as detects a change in the operation state of the information processing device 401, the operation state being detected at the operation state detection unit 402. With reference to the current operation item and the change in the operation state, the frequency unit 410 increases the value of the frequency by 1.

The competence judgement unit 411 holds the threshold value N, and compares the frequency to it at each increase of frequency. Whether an operation item is "Known" or "Unknown" is judged from this comparison, and judging result is written into a corresponding competence column of the competence memory unit 412.

As shown in FIG. 13, the operation procedure memory unit 403 holds two sorts of operation guide programs depending on two competence levels, "known" and "unknown".

The operation guide determination unit 405d comprises a memory unit for holding information which indicates a change in the operation state of the information processing device 401; an operation route judgement unit for judging if there exist a plurality of routes to be taken from the current operation item to the target operation item as referring to the memory unit; a selection unit for selecting one of the routes with reference to the frequency at the competence memory unit 412 so that help documentation will be generated according to the selected route; and a program readout unit for reading from the operation procedure memory unit 403 operation guide programs corresponding to operation items embodying the selected route in considering the user's competence level for the information processing device.

Figure 14:
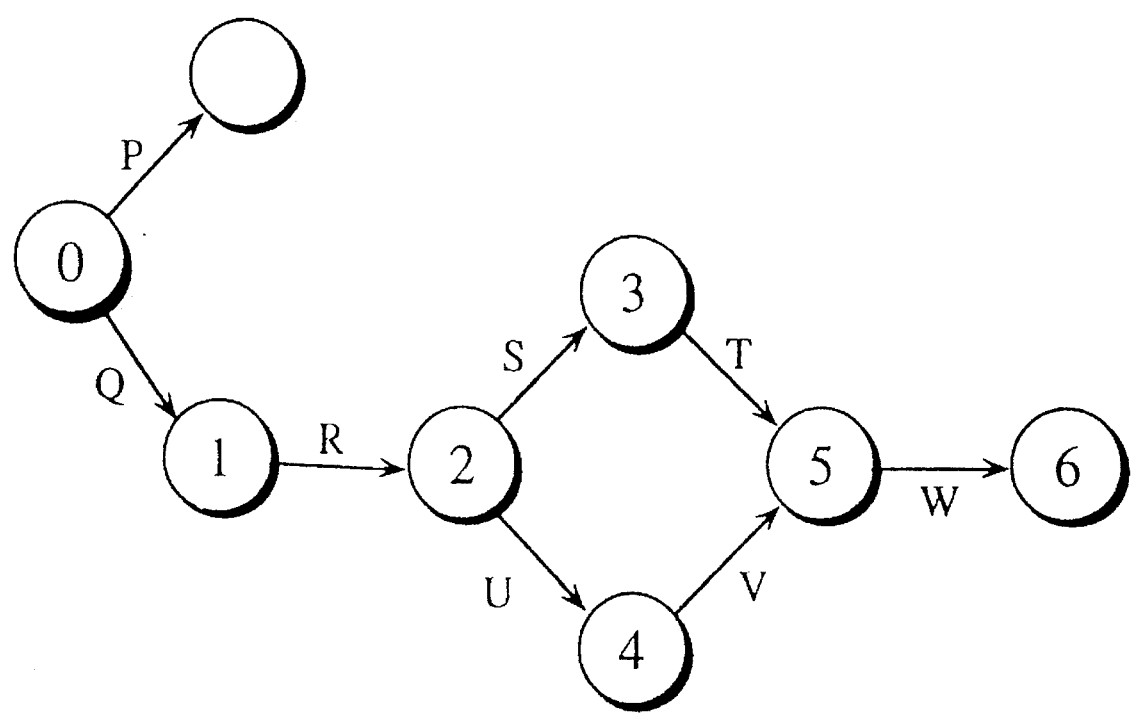
FIG. 14 shows operation state of an information processing device in the second embodiment of the present invention.

FIG. 14 shows a change in the operation state of the information processing device 401 which is commonly observed. In the figure two routs (or more than two) can be taken to transit from State 2 to State 5. Therefore, one of the routes providing the most appropriate help documentation to a user will be selected with reference to the user's competence for the information processing device. Description of the operation corresponding to each operation state will be omitted herein.

Figure 15:
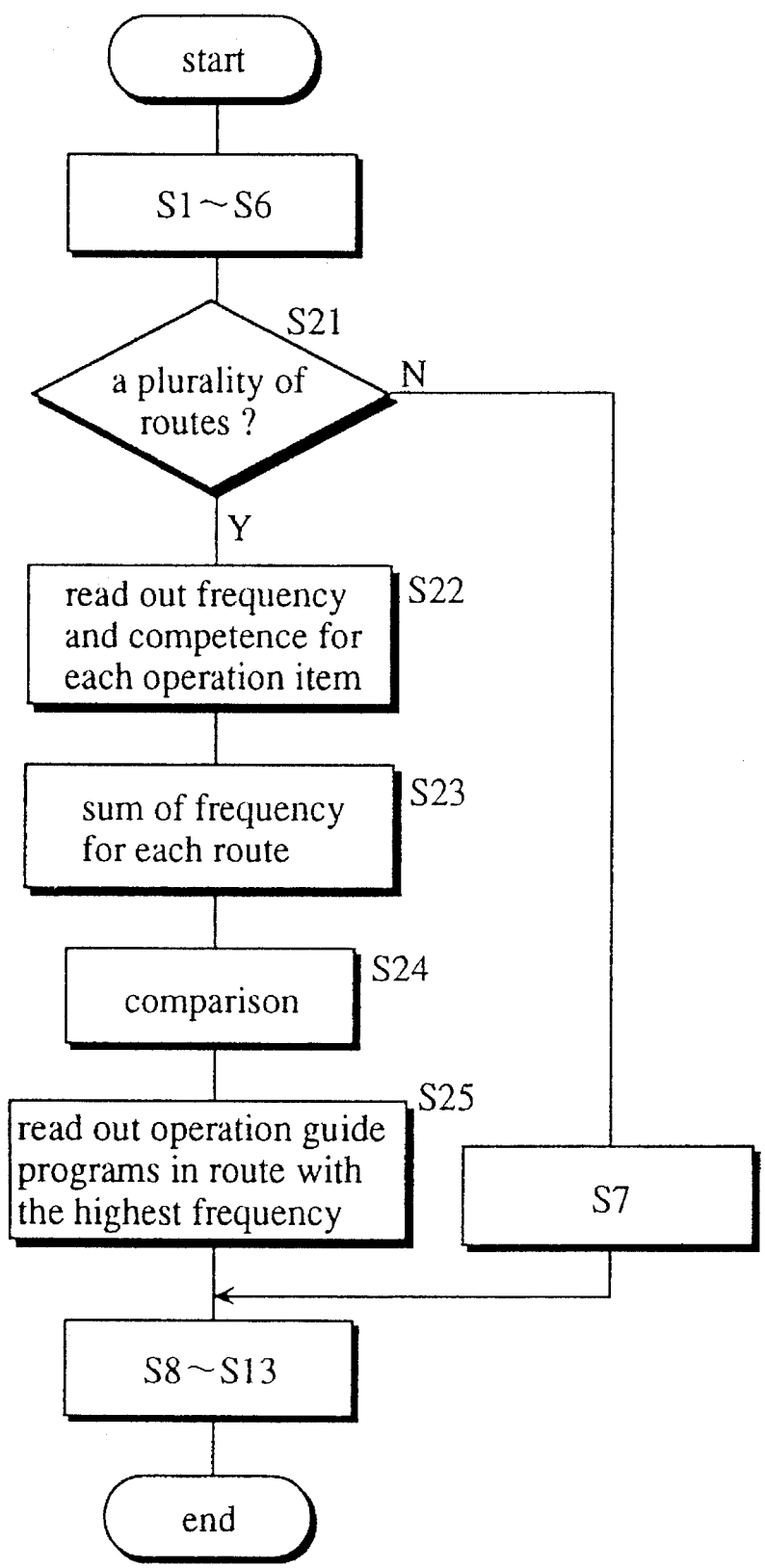
FIG. 15 is a flow chart describing operation of the operation guide device in the second embodiment of the present invention.

Operation of the processing information device with the above construction will be described with reference to FIG. 15. Operations at S1-S6 are the same as those in the first embodiment, so that description thereof will be omitted. It is assumed that the current operation item and the target operation item are detected at S5 and S6, so that operation items corresponding to operation guide programs are detected. Further, it is assumed in FIG. 14 the current operation item is R; the target operation item is W; and two routes exist between W and R. One of the two routes includes operation items S, T, W; while the other route includes operation items U, V, W. Since it is detected that a plurality of routes exist between the current operation item W and the target operation item R at S21, the frequency and the competence for all operation items will be read from the learning level memory unit 412 at S22. Subsequently, the sum of the frequency for each of the two routes is computed. To be concrete in the above example, the sum for the route S, T, W is: N+ 2(N−1)= 3N−2; while the sum for the route U, V, W is: N+(N+1)+(N−1)=3N. Then, the obtained sums are compared to each other, and the route having the largest value will be selected as the route which provides the most appropriate help documentation to the user. In the above example, the route U, V, W having the larger value 3N will be selected. Next, the user's competence in each of the operation items embodying the selected route is detected in FIG. 12; and the operation guide program corresponding to the user's competence is read from the operation procedure memory unit 403. To be concrete, the operation guide program at "known" column in FIG. 13 will be read if the user's competence for the operation item indicates "known" while the operation guide program at "unknown" column will be read if the user's competence for the operation item is "unknown". In the above example, demo u 1( ) selected for operation item U, demo v 1( ) selected for operation item V, demo w 2( ) selected for operation item W will be read from the operation procedure memory unit 403.

The operation of the above operation guide programs are the same as the operations at S8–S13 in the first embodiment, and description thereof will not be repeated.

An information processing device other than a word processor can be employed in the above. For example, the above operation guide device may be applied to an automobile carrying complex electronic devices such as an audio system, VTR, and an automatic display unit for locating itself in a map, chemical processing plant, or the like. Also the operation guide device may be replaced with a floppy disk in which programs for required operations are stored; and a personal computer or a word processor will operate as the operation guide device once such floppy disk is inserted therein.

Also, not only a visual message on the CRT but also an audio message can be provided to the user.

In the first embodiment the word processor with simple construction was employed; however, a large scale word processor employed at a company or at a press can be employed therein. For example, a word processor capable of editing, printing or a machine translation; as well as a word processor developed for a special purpose, such as the one employed at a patent office for an electronic application or the word processor employed at the Japanese patent office for substantial examination can be applied to the first embodiment. That is, operation method and operation procedure of such complex word processor are apparent from usage and construction thereof; therefore, a maker (a planner, a designer, and a programmer) of the operation guide device can predict instruction needs for a user of the word processor, and reflect the needs in development of the operation guide device. To be concrete, unknown operation items are predicted and documentation corresponding thereto are prepared. Further, the maker also predicts an operation guide request message at CRT which will be input by a user to request for a help documentation. Thus, appropriate help documentation can be provided to a user of any information processing device.

Concrete operation of the operation guide device will be determined in accordance with construction or operation of an information processing device to which it is applied; therefore, this will not be described herein.

Further, a user's competence for a personal computer, or a machine translation device can be set similarly as a user's competence for the word processor in the second embodiment. For example, a user's competence will be high if program input to a personal computer is long enough. Also, a user may know some program language called FORTRAN if input includes "IF", "THEN", "Call", "Go To", or the like. According to sort or difficulty level of FORTRAN included in the input, the user's special knowledge of the program or basic knowledge of C language, ALGOL (Algorithmic Language) or the like can be measured. Depending on a computation or a program to be operated, a microcomputer needs to be equipped with an additional device. Therefore, a user's competence for the microcomputer can be judged by examining construction or operation of the additional device. That is, the larger and the more complex the additional device is, the more the user is experienced with the microcomputer.

A user's instruction needs and competence in a machine translation device can be determined by analyzing operation guide request message provided by the user at editorial operation of the translated document. For example, if a user provides no comment or correction to a relatively long translation that an experienced translator judged far from satisfactory, the user may not be competent for the target language as well as for the machine translation device. On the other hand, considering that more sophisticated language dictionary is used by a learner with higher language competence, a user being competent for the target language will repeat input/output operations to translation quite often or use an uncommon word. Consequently, a user's target language competence or competence for the machine translation device can be judged by counting input/out operations of an uncommon word or a ratio thereof to a total number of words in the whole translation. In this case, it is necessary to register such uncommon word in a reference dictionary accommodated inside of the machine translation device beforehand. Once a user's language competence and competence in the machine translation device are found, help documentation designed to reflect the user's needs will be displayed on CRT. For example, some parts of the help documentation disagreeing with the user's needs will be eliminated by a program before it will be provided to the user. Needless to say, measurement of language competence and competence for an information processing device varies depending on construction of the information processing device and its usage.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An operation guide device for displaying an operation in accordance with a request made by an operator, the operation guide indicating how to execute a required operation which needs to be operated in order to complete a target operation, the operation guide device comprising:

a first input means for inputting an operation guide request message to request the operation guide:

a second input means for inputting a message naming the target operation;

operation state detection means for detecting a current operation state of an information processing device being operated by the operator of the operation guide device wherein the operation state detected is a small unit of operation of a program currently operated by the information processing device;

operation determination means for determining operations required in accordance with the current operation state and current target operation comprising a key word extract unit for extracting a key word from the message inputted by the second input means, target operation detection means for detecting a target operation corresponding to the key word extracted at the key word extract unit in accordance with a correspondence table showing correspondence between each target operation and each key word, an operation state transition memory unit for holding each change in the operation state of the information processing device, and an operation determination unit for referring to the operation state transition memory unit to determine the operations embodying the required operation based on the current operation state detected at the operation state detection means and the target operation detected at the target operation detection unit;

operation guide display storage means for holding help documentation for each operation to be executed at the information processing device;

display means; and control means for reading from the operation guide display storage means the help documentation corresponding to each of the operations determined at the operation determination means, and displaying the help documentation at the display means.

2. The operation guide device of claim 1 further comprising proficiency level storage means for holding a proficiency level of the operator for each operation at the information processing device, wherein the operation guide display storage means holds the help documentation for each of two proficiency levels of the operator, the proficiency levels including a known level and an unknown level; and the control means reads from the operation guide display storage means the help documentation for each of the operations determined at the operation determination means in responding to the proficiency level of the operator stored in the proficiency level storage means.

3. The operation guide device of claim 2, wherein the proficiency level storage means holds a space to be filled with frequency information indicating how many times the operator has executed each operation at the information processing device before.

4. The operation guide device of claim 3, wherein the operation determination unit comprises an operation route judgement unit for judging if there exists a plurality of routes to be taken from the current operation to the target operation; detects from the proficiency level storage means the frequency information for each required operation when the judgement unit judges that a plurality of operation routes exist; and selects as the operation guide the route corresponding to the frequency information having the largest value.

5. The operation guide device of claim 4 further comprising:

count means for counting a frequency, the frequency indicating how many times the operator has executed each operation at the information processing device before;

comparison means for comparing the frequency at the count means to a threshold value defining the proficiency level of the operator; and writing means for writing into the proficiency level storage means the frequency and comparison result at the comparison means.

6. An operation guide display method, used by an information processing apparatus having a first input means for inputting a desired display of an operation guide; a second input means for inputting a message naming a target operation; operation guide display storage means for storing each operation that corresponds with an appropriate display content for informing an operator of an operation; state transformation storage means for storing how an operation state of the apparatus is transformed; and a display means, for displaying an operation procedure for which the operator has requested guidance, wherein said operation guide display method comprises:

a step for detecting a present operation state of an apparatus being operated by the operator;

a step for extracting characters to be used as a key word from the message inputted via the second input means;

a step for referencing the extracted key word in a correspondence table and thereby determining a target operation corresponding to the extracted key word;

a step for referencing the state transformation storage means and for deciding, from the determined target operation and the previously detected present operation state, a list of operations which are necessary for an operation guide for the operator; and a step for retrieving a display content related to the decided list of operations from the operation guide display storage means and displaying the display content on the display means.

7. The operation guide display method of claim 6, wherein the information processing apparatus further includes proficiency level storage means for storing a proficiency level of the operator for each operation and the operation guide display storage means stores a display content for both cases of a nonproficient and a proficient proficiency level, and wherein the operation guide display method further includes:

- a step for counting, for each operation in information processing apparatus, a number of times the operator has performed each of the operations;
- a step determining from a present count value whether the operator is proficient or nonproficient; and
- a step for retrieving a display content corresponding to a proficiency determination result from the operation guide display storage means.

8. The operation guide display method of claim 7, further including a step for sequentially updating the contents of the proficiency level storage means in accordance with the determination result of nonproficient/proficient mode in accordance with the present count value.

* * * * *